United States Patent [19]

Boisvert, Jr.

[11] 3,805,243

[45] Apr. 16, 1974

[54] APPARATUS AND METHOD FOR DETERMINING PARTIAL MEMORY CHIP CATEGORIES

[75] Inventor: Conrad J. Boisvert, Jr., Wappingers Falls, N.Y.

[73] Assignee: Cogar Corporation, Wappingers Falls, N.Y.

[22] Filed: Feb. 22, 1971

[21] Appl. No.: 117,450

[52] U.S. Cl. .......... 340/172.5

[51] Int. Cl. .......... G06f 11/04

[58] Field of Search .......... 235/151, 153; 340/172.5

[56] References Cited

UNITED STATES PATENTS

| | | | |
|---|---|---|---|
| 3,350,690 | 10/1967 | Rice | 340/172.5 |
| 3,434,116 | 3/1969 | Anacker | 340/172.5 |
| 3,422,402 | 1/1969 | Sakalay | 340/172.5 |
| 3,444,526 | 5/1969 | Fletcher | 340/172.5 |
| 3,311,890 | 3/1967 | Waaben | 340/172.5 |

*Primary Examiner*—Paul J. Henon
*Assistant Examiner*—Mark Edward Nussbaum
*Attorney, Agent, or Firm*—Gottlieb, Rackman & Reisman

[57] ABSTRACT

A machine-practiced method for determining quarter-partial memory chip categories. In the case of 1024-cell chips having ten address bits, there are 180 quarter-partial memory chip categories; permanently addressing any two of the 10 address lines with 1's or 0's, or combinations thereof, produces an effective 256-cell chip, any cell of which can be selected depending upon the address bits extended to the other eight address lines. The method allows a rapid determination of the applicable quarter-partial chip categories after all of the cells on the chip are first tested and the bad cells are identified. One way to identify the bad cells is to use a test sequence which has the minimum length required to test for all dynamic failure modes of interest. Apparatus is also disclosed for testing the cells at a slower rate, but with a minimum of tester complexity.

6 Claims, 5 Drawing Figures

Figure 1:
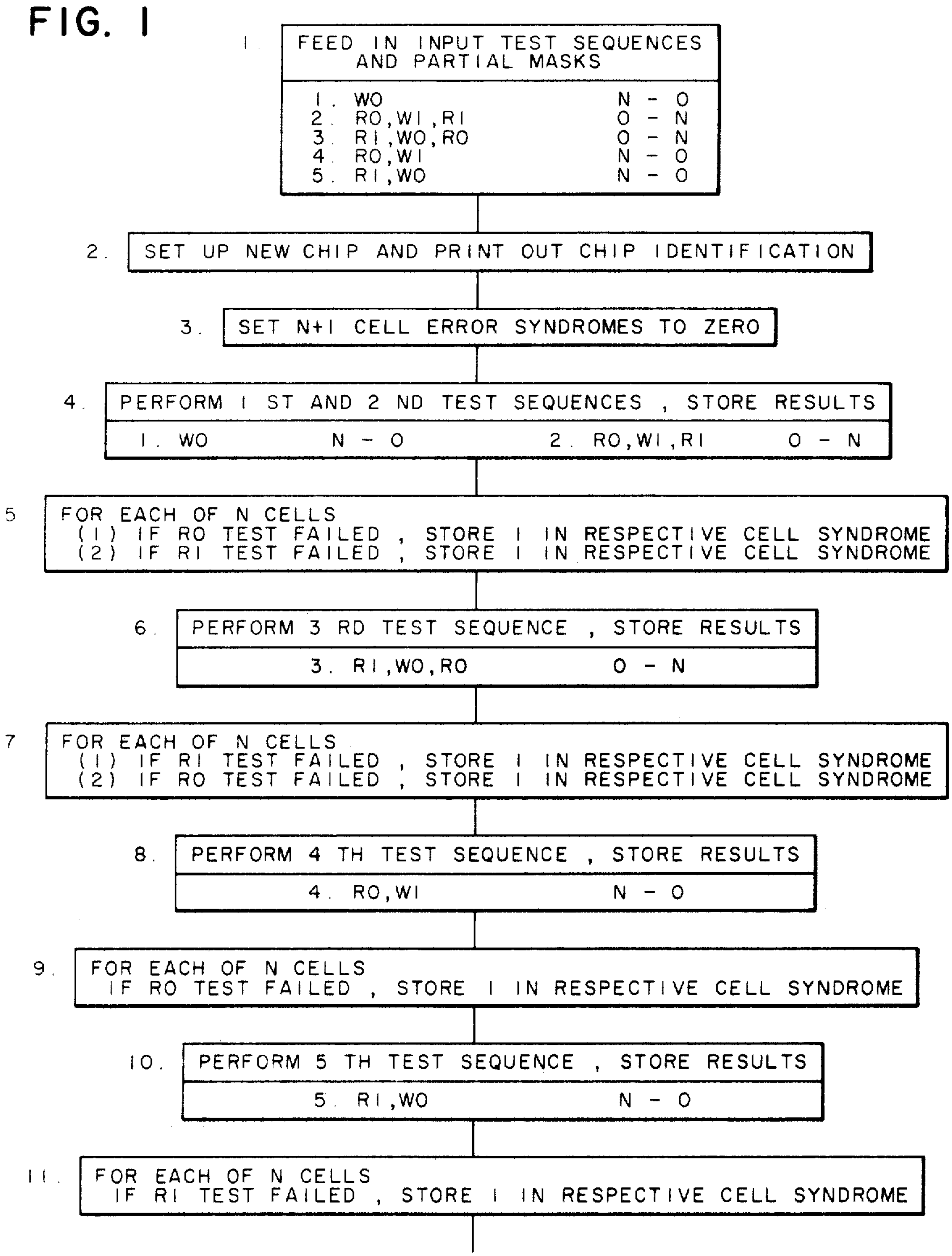

INVENTOR
CONRAD J. BOISVERT JR.
BY Gottlieb, Rackman & Reisman
Harry M Weiss
ATTORNEYS

APPARATUS AND METHOD FOR DETERMINING PARTIAL MEMORY CHIP CATEGORIES

This invention relates to partial memory chips, and more particulary to an apparatus and method for determining partial memory chip categories.

A typical semiconductor integrated circuit memory chip contains a plurality of memory cells and a sufficient number of address lines to enable the selection of a particular cell. For example, in the case of a chip having 128 cells, seven address bits are required to identify any given cell. In a typical memory array, the same address bits are extended to each chip; the same numbered cell is identified in each chip. In order to select particular cells in the overall array (to operate upon only those cells in a predetermined word), each chip is provided with a chip select conductor. The only cells which are operated upon are those which are identified by the common address bits and which are contained on chips whose chip select conductors are energized.

It is often found that not all cells on a particular chip are functional. There are a variety of systems commercially available for performing individual tests on each cell of a chip being tested. With the use of such automated equipments it is possible to determine which cells are not functional. Standard test equipments can generally be programmed so that different test sequences are performed on different types of chips, thus not requiring a separate test system for every type of chip produced.

Despite great advances in semiconductor technology. it is often found that one or more cells on a memory chip are not functional. Rather than to throw away such a chip, it has been suggested to use only some of the operative cells on the chip. For example, consider the case in which a single cell on a 128-cell chip is inoperative. The chip can be used in a memory array provided that the address conductors never identify the inoperative cell. This can be accomplished by using only six of the seven address conductors and utilizing the chip in an array in which each chip has only 64 functional cells. Each address bit of the seven address bits serves to divide the chip into two parts, each containing 64 cells. Any one of the seven address conductors can be wired permanently to a fixed potential (low or high, that is, a 0 or 1) so that the address bits on the other six address conductors identify one of the 64 cells in the group containing 64 operative cells. In effect, by wiring one of the address conductors to a fixed potential, the chip is converted to a chip of half the capacity.

It is apparent that if a single cell in a 128-cell chip is inoperative, the chip can be used as a partial chip in any one of seven different ways. For example, suppose that the address of the inoperative cell is 1001001, where a 1 represents a high potential on the respective address conductor and a 0 represents a low potential on the respective address conductor. To preclude addressing of the inoperative cell, all that is required is to insure that at least one of the seven address conductors cannot be addressed with the respective bit in the address of the cell. For example, if any one of the first, fourth and seventh address conductors is wired to a low potential, the inoperative cell cannot possibly be operated upon because the seven address bits cannot all be of the necessary values to identify the cell. Similarly, if at least one of the second, third, fifth and sixth address conductors is permanently wired to a high potential, the inoperative cell can never be addressed. Whichever address conductor is permanently wired to the potential which will preclude addressing of the inoperative cell, the six address bits supplied to the other six address conductors enable 64 good cells to be addressed.

It is apparent that in the case of 128-cell chips, there are 14 "half-partial" categories. Each category is associated with a respective one of the seven address conductors being permanently wired to a high or low potential. In the usual fabrication of memory system, the chips are contained in modules (more than one chip can be included in the same module) and the modules are attached by pin connections to a circuit board. Typically, a printed circuit board used in conjunction with 128-cell chips for deriving a memory in which only 64 cells on each chip are utilized would have a wiring pattern such that chips of the same partial category would be used on the board. For example, the board might be designed such that address conductor 4 would be connected to a low potential while only the other six address conductors would be addressed high or low. In such a case, the partial chips which would have to be used on the board would be those in which 64 good cells can be addressed when the fourth address conductor is held at a low potential.

For maximum flexibility in production it would be highly desirable to identify all half-partial categories of each chip. In the case of a 128-cell chip having only a single inoperative cell, the chip can be used in any one of seven different types of arrays, that is, it can be used on seven of the fourteen possible circuit boards — namely, the seven boards which permanently address one of the seven address conductors with a bit different from the bit necessary to address the inoperative cell. It is possible for a chip having only two inoperative cells to be incapable of use as a half-partial chip. For example, if cells 1001001 and 0110110 (with complementary addresses) are both inoperative, it is apparent that no matter which of the seven address conductors is tied to a high or low potential, the cycling of the other six address conductors will result in the addressing of one of the two inoperative cells. Depending on the number of cells which are inoperative on any 128-cell chip, and their addresses, it is possible for the chip to be identified in anywhere from no partial chip categories to seven partial chip categories of the total of fourteen half-partial categories. If the chip is identified by three such categories, for example, it can be used with any one of three different types of 64-cell chip arrays. (In some cases, chips of different categories can be used on the same circuit board but this requires additional wiring of pins to high or low potentials, but even in this case it is necessary to know the partial categories of each chip used in the array and it is therefore highly desirable to know the partial categories of all chips so that they can be used in any category in which there is a need for more chips.)

The straightforward approach to the determination of partial chip categories is for the automatic tester to apply a fixed potential to one of the seven address conductors and to then cycle the other six address conductors through a total of 64 states. Each of the addressed cells is tested, and if it is determined tht they are all good the chip can be identified in the category in which the selected address conductor is permanently wired to the fixed potential. It is apparent that this approach requires fourteen different test sequences, each sequence including the complete testing of 64 cells. 14 sequences are required because each of the seven address conductors must be connected to both a high a low potential while the other six address conductors are cycled. This is an exceedingly time-consuming process.

In my copending application, Ser. No. 59,109, U.S. Pat. No. 3,644,899 filed on July 29, 1970, and entitled "Method for Determining Partial Memory Chip Categories" (hereby incorporated by reference) there is disclosed a method for very rapidly determining half-partial memory chip categories. This method entails the examination of each address bit of each bad cell on the chip. Depending on the value of each such bit, one of two respective half-partial chip categories is eliminated. After all cells have been processed in this manner, those of the 14 half-partial chip categories which have not been eliminated are those applicable to the chip.

But it is also possible to permanently wire two or more of the address conductors to fixed potentials in which case the 128-cell chip is converted to a chip having only 32, 16 or fewer operative cells. For example, if address conductors 2 and 5 are permanently wired to high and low potentials respectively, it is apparent that bits on the other five address conductors can only cause the selection of cells in a group of 32 cells. In such a case, the chip can be used as a quarter-partial.

The problem with determining all of the quarter-partial categories applicable to any chip (or eighth-partial categories, etc.) is that there are often so many that to determine all of the applicable partial categories may be a formidable task. For example, consider the case of 1024-cell chips which have ten address conductors. If two of these conductors are to be permanently wired, there are 45 combinations of two conductors which can be selected for this purpose. Furthermore, the two conductors can be permanently wired in any one of four different states (00, 01, 10 and 11), and thus there is a total of 180 quarter-partial chip categories. The brute force approach of test wiring all 45 pairs of address conductors (four different times each for the four bit combinations) and then testing the 256 cells in each of the 180 quarter-partials is very time consuming.

It is a general object of my invention to provide a method for very rapidly determining quarter-partial, eighth-partial, etc. memory chip categories.

But even before partial chip categories can be ascertained, it is necessary to determine which cells on the chip are bad. There are several different types of dynamic cell failures and each cell must be tested for them. Although there are many automatic testers commercially available, it is usually the user who determines the sequence for testing the cells. A typical tester is programmed to perform specific tests on the cells in a predetermined sequence, the object of the sequence being to test for all possible failure modes of interest. Many test sequences have been devised, and a relatively efficient test sequence is disclosed in my copending application, Ser. No. 61,674, U.S. Pat. No. 3,659,088 filed on Aug. 6, 1970, and entitled "Method for Indicating Memory Chip Failure Modes" (which application is hereby incorporated by reference). However, there is a great need for more efficient test sequences, that is, test sequences which can fully test a memory chip in the shortest possible time. The number of testers required by a manufacuturer of memory chips, for example, is inversely proportional to the time required for the testing of a single chip.

It is another object of my invention to provide a test sequence for determining the bad cells on a memory chip which, when used by any given tester, enables all of the failure modes of primary concern to be tested for in the shortest possible time.

For a manufacturer of integrated circuit memory chips, there is a need for speed and flexibility in testing the chips. Although automatic testers are relatively expensive, their costs are justified by the speeds at which they operate and their flexibility. However, for the end user of the memory modules — who, for quality assurance purposes, also often tests all incoming memory chip modules — there is a need for inexpensive testers, even though these testers may use relatively inefficient test sequences. The more expensive testers can be programmed to test a chip in any desired sequence; it is this flexibility which to a great extent contributes to the cost of sophisticated testers. For the end user, it would be highly advantageous to provide a tester which has less flexiblity but is considerably less costly.

It is another object of my invention to provide a tester which is simple in design and therefore relatively inexpensive to manufacture.

In accordance with the principles of my invention, in the illustrative embodiment thereof, in order to determine the 180 quarter-partial categories applicable to a 1024-cell chip, 45 predetermined masks (data words) are required. Each mask contains 0's in eight of its ten bit positions, and 1's in the other two positions. These 45 masks identify all of the quarter-partial categories without specific reference to the bit values of the two wired address conductors in each case. The 10-bit address of each bad cell is separately masked by each of the 45 masks (utilizing conventional computer masking instructions or sequences) to determine the values of the two address bits for the inoperative cell in the positions of each mask which contain 1's. The values of these two bits in each case are then used to identify one of the four quarter-partial categories associated with each mask. This quarter-partial category (one of 180) is then eliminated.

Each bad cell is masked by each of the 45 masks and all of the identified quarter-partial categories are eliminated. After all of the addresses of the bad cells have been processed in this manner, those of the 180 quarter-partial categories which have not been eliminated are printed so that a record is made of all quarter-partial categories applicable to the chip. (To determine all of the eighth-partial categories applicable to a 1024-cell chip, it is apparent that each of 120 masks must have three 1's and seven 0's; when the address of each bad cell is masked by one of these masks, the three bit values in the address at the positions corresponding to the 1's in the mask are used to eliminate one of eight possible eighth-partial categories associated with the mask.)

As will be described below, in order to determine the addresses of bad cells in the shortest possible time, it is necessary to perform five different test sequences on each cell. Each test sequence is performed on all of the cells on the chip as they are addressed in either ascending or descending order. Thereafter, the next test sequence is performed on all of the cells on the chip, in either ascending or decending order. As will be described, there are many variations of the basic test sequence which allow the cells to be tested in the shortest possible time. However, all of these shortest possible sequences must comply with certain rules which I have discovered.

On the other hand, if it is desired to reduce the cost of a tester at the expense of testing time and flexibility, it is possible to employ a tester of unique design. This tester includes two counters, one of which feeds the other. The count of each counter identifies the address of a cell on a chip. The low-order counter goes through a complete cycle each time that a single cell is identified by a high-order counter. Timing and control circuits determine which counter is actually used to address a cell on a chip being tested, and which tests and operations are performed on it. There is little flexibility in the sequence in which the cells can be addressed since the mode in which the two counters cycle is relatively fixed. However, by using these counters to control the addressing of the cells, it is possible to construct a relatively inexpensive tester, although the actual test sequence for the cells cannot be the theoretical minimum.

Figure 3:
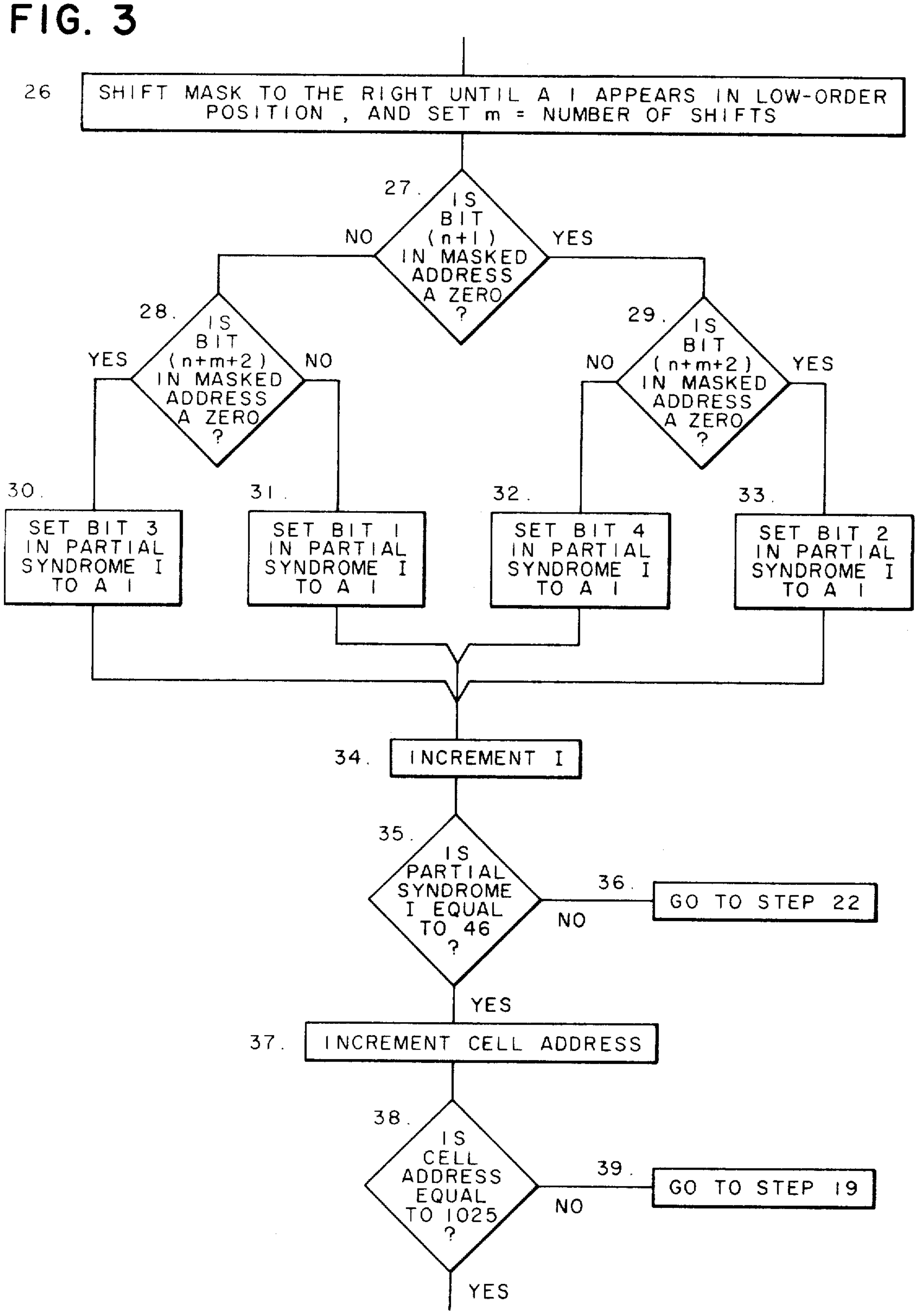
Figure 4:
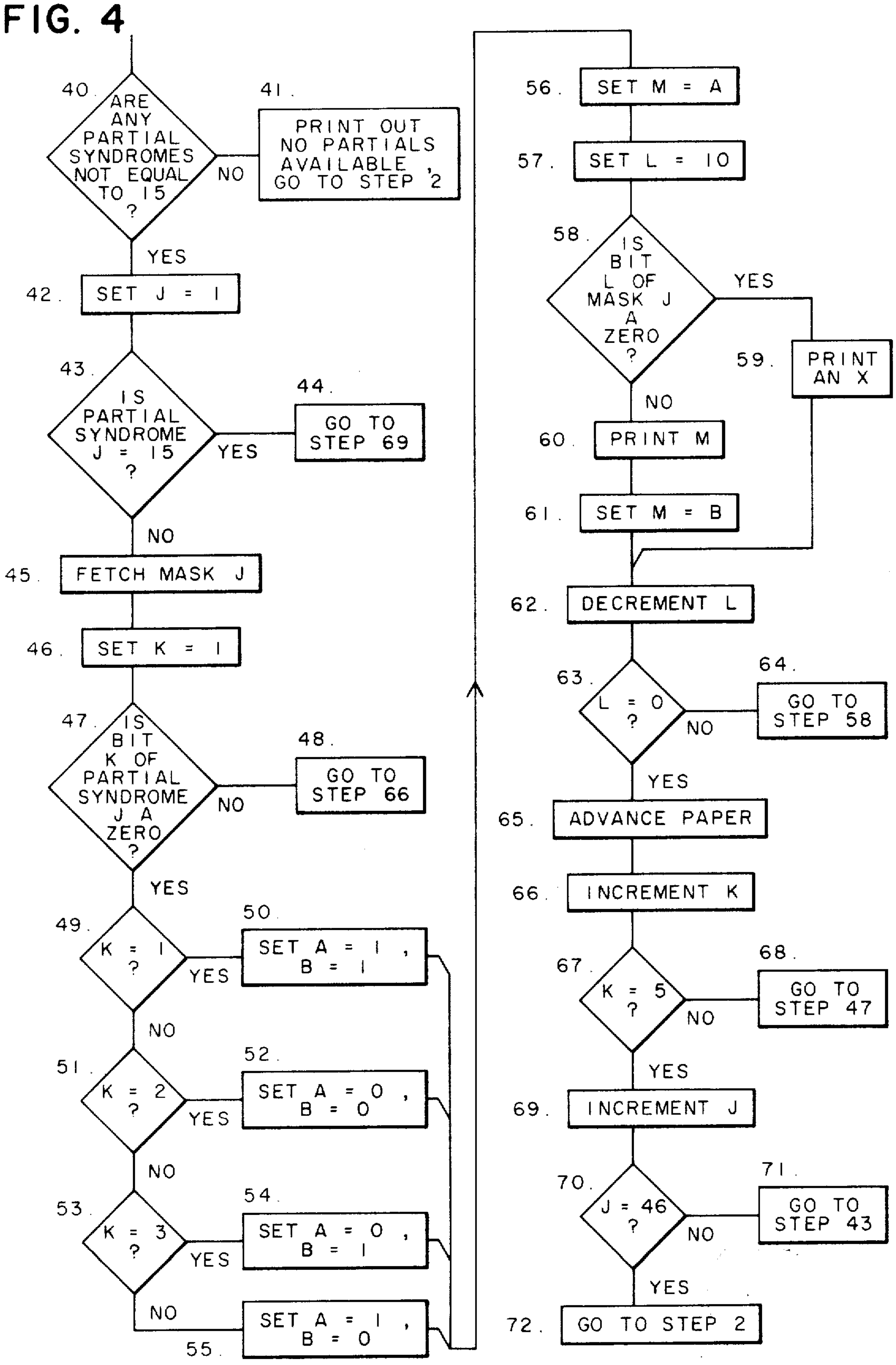
Figure 5:
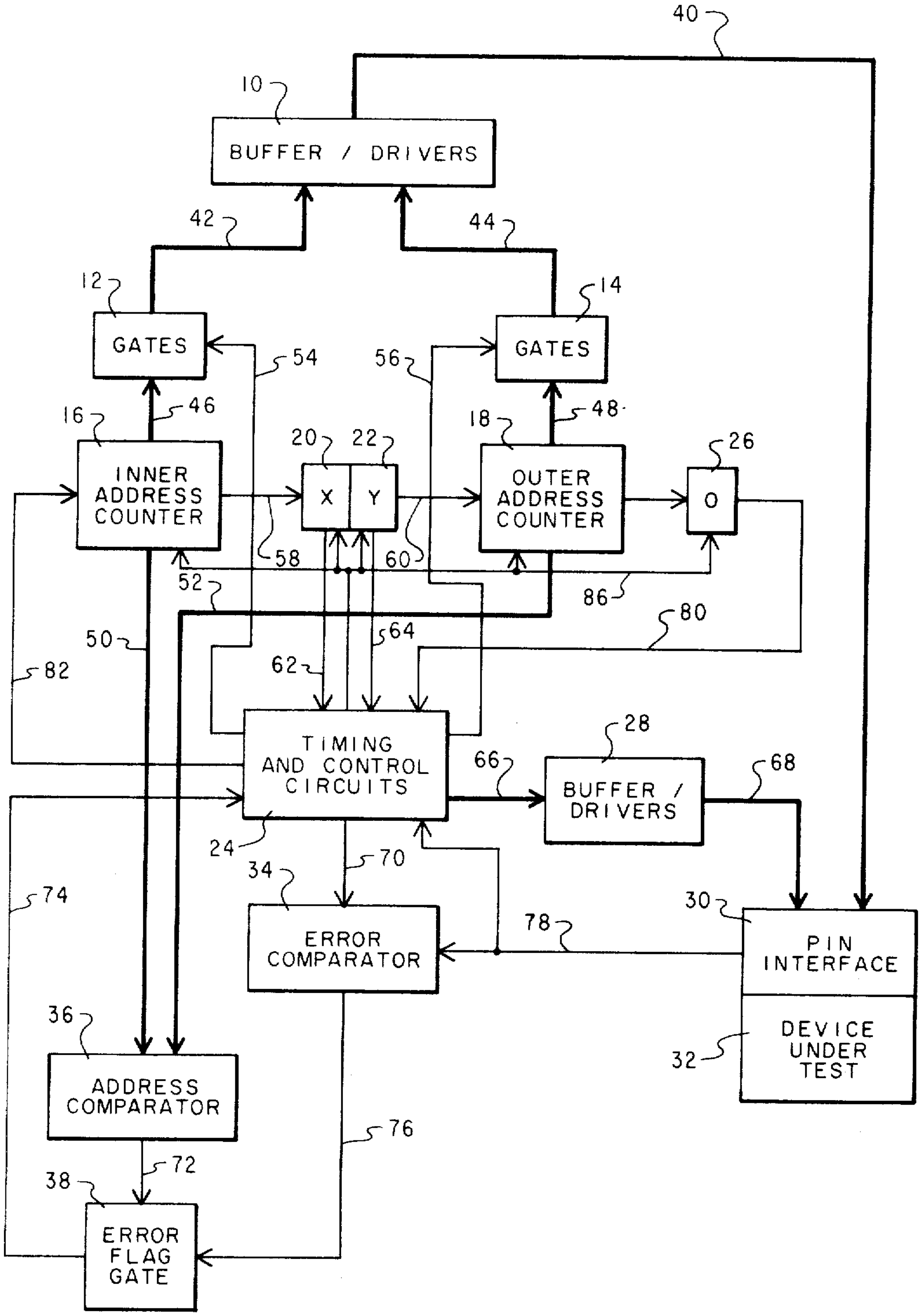

Further objects, features and advantages of my invention will become apparent upon consideration of the following detailed description in conjunction with the drawing, in which:

FIGS. 1–4, with the figures being placed one on top of the other, depict a flow chart illustrating the steps performed in one illustrative embodiment of my invention first to test all of the cells on a chip with a most efficient test sequence, and then to determine the quarter-partial categories applicable to the chip; and FIG. 5 depicts illustrative apparatus, relatively simple in design, for testing all of the cells on a chip, although not in the most efficient sequence from a time standpoint.

In order to appreciate the difficulties in identifying quarter-partial categories, it will be helpful first to set forth the manner in which half-partial categories are identified in accordance with the method disclosed in my copending application, Ser. No. 59,109. In the illustrative embodiment of the invention disclosed in that application, each chip contains 128 cells. All of the cells on the chip are tested in a conventional manner (without applying a fixed potential to one of the address conductors while all of the others are cycled). The testing of the cells is performed without partial chip category considerations. During the testing, the inoperative cells are identified (as all seven address bits are cycled in the case of 128-cell chips). No further tests are performed to determine the partial chip categories. Instead, they are determined solely by a computer (generally, a part of the tester in the first place) from the addresses of the inoperative cells. The data processing is very fast since it does not involve actual testing of cells. In fact, following the testing of a chip, while the tester is causing the next chip to be moved underneath the test probes, the computer determines the half-partial chip categories and controls their printout. In a typical case, the algorithm for determining the partial memory chip categories is finished by the time the next chip is in place; thus, conventional test sequences can be utilized and yet a list of half-partial memory chip categories for each chip can be provided with no additional time required for the processing of each chip.

The algorithm utilized to identify applicable half-partial categories can be understood by first associating the partial categories with the seven address lines (in the case of 128-cell chips). The address lines are numbered 0 through 6, and a chip is of partial category (or type) 1 if when address line 6 is held at a high potential (1) and the other six address lines are cycled, 64 good cells are addressed. Similarly, the chip is of partial type 2 if when address line 6 if held at a low potential (0) and the other six address lines are cycled, 64 good cells are identified.

A chip is of partial type 3 if when address line 5 is held at a high potential (1) the other six address lines can be cycled to address 64 good cells. Similarly, if address line 5 is permanently connected to a low potential (0) and the other six address lines can be cycled to address 64 good cells, the chip is of partial type 4. The following table associates each partial category with its respective address line and a particular permanent value for that line:

| | address line | 0 | 1 | 2 | 3 | 4 | 5 | 6 | |
|---|---|---|---|---|---|---|---|---|---|
| partial type | | 13 | 11 | 9 | 7 | 5 | 3 | 1 | address bit value 1 |
| | | 14 | 12 | 10 | 8 | 6 | 4 | 2 | address bit value 0 |

Consider a particular inoperative cell having an address 1001001. A chip of half-partial type 1 is a chip in which if address line 6 is held at a high potential the other aix address lines can be cycled to identify 64 good cells. The converse of this statement is that if any cell is no good and its address includes a 1 in address bit position 6, then the entire chip cannot be utilized as a partial type 1. Since the most significant address bit for the cell under consideration is a 1 and the cell is no good, partial category 1 is eliminated.

Similary, because the fifth address bit is a 0, the chip cannot be utilized in partial category 4. Referring to the chart above, if a chip is of partial type 4 it means that the fifth address conductor can be tied to a low potential (0) while the other six address conductors are cycled to address 64 good cells. In the case of the chip under consideration, if address line 5 is tied to a low potential, as the other six lines are cycled eventually the address will be 1001001 and an inoperative cell will be identified. For this reason, the chip under consideration with an inoperative cell having an address 1001001 cannot be contained in partial category 4. A further analysis of this type in conjunction with the chart above immediately reveals that the chip under consideration cannot be contained in categories 1, 4, 6, 7, 10, 12 and 13.

The first time an inoperative cell is detected, seven of the fourteen half-partial categories are eliminated. If the cell with a complementary address is also inoperative, the chip cannot be utilized in any partial chip configuration even though there may be only two inoperative cells. In the example above, if the address of the second inoperative cell is 0110110, partial categories 2, 3, 5, 8, 9, 11 and 14 are eliminated. In such a case, there are no partial categories left.

On the other hand, suppose that the second inoperative cell has an address 1001011. With reference to the chart above, the partial categories which are eliminated by this inoperative cell are categories 1, 3, 6, 7, 10, 12 and 13. The first inoperative cell eliminated six (1, 6, 7, 10, 12 and 13) of these seven partial categories. Thus the two cells together eliminate eight of the 14 possible categories. If no other cells are inoperative, the chip can be classified in categories 2, 5, 8, 9, 11 and 14.

It is thus apparent that all that is required to determine all of the half-partial chip categories for a particular chip are the addresses of the inoperative cells. The algorithm used is based on the following observation: a chip of half-partial type 7, for example, is a chip in which, if address line 3 is held at a high potential, the cycling of the other six address lines will identify 64 good cells. Conversely, if any cell is no good and bit 3 in its address is a 1, the entire chip cannot function as a partial type 7 chip. Similar remarks apply to each of the other 13 half-partial categories. Thus, simply by operating on the addresses of the inoperative cells (in a sequence described in my application Ser. No. 59,109), it is possible to identify all half-partial chip categories without performing any tests on the chip other than the conventional tests used to identify good and bad cells.

In the case of a chip containing 1024 cells, 10 address lines are required rather then seven. There are thus 20 half-partial chip categories rather than 14. But as described above there are no less than 180 quarter-partial categories. It is apparent that it would be highy advantageous to determine partial categories by operating on the addresses of the bad cells rather than physically holding two of the address lines at fixed potentials while testing the associated 256 cells.

Figure 2:
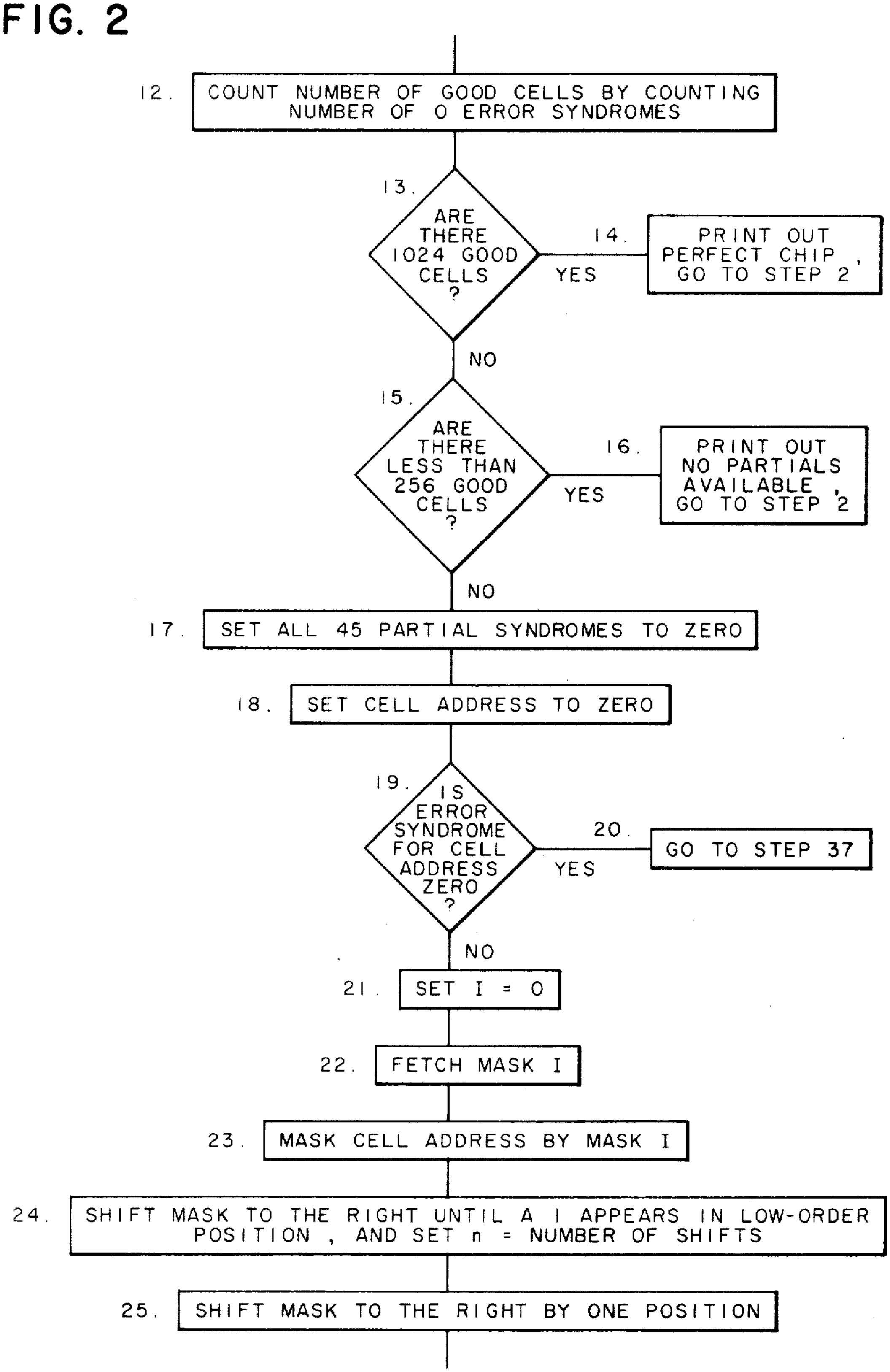

The flow chart of FIGS. 1–4 can be considered in two parts. FIG. 1 is directed primarily to the improved test sequence for actually determining which of the cells are bad. The actual test sequence will be described later on. FIGS. 2–4 depict the manner in which the applicable quarter-partial categories are determined. In order to understand the steps in the method starting with step 12 on FIG. 2, all that must be understood with respect to the steps depicted on FIG. 1 is that they control two types of information to be stored in the machine on which the method is practiced. First, for each of N cells on the chip (although the steps of FIG. 1 are applicable to a chip having any number of cells (N+1), the steps of FIGS. 2–4 relate particularly to a chip having 1024 cells, the extension of the method depicted in FIGS. 2–4 to a chip having any number of cells being apparent to those skilled in the art) there is a data bit or word stored in the memory of the computer which is referred to as a cell syndrome. The cell syndrome simply identifies the cell as being good or bad, a bit of value 1 indicating a bad cell and a bit of value 0 indicating a good cell. Also stored in the machine are 45 masks each 10 bits in length. Each mask consists of eight 0's and two 1's, 45 masks being required to represent the 45 possible combinations of two bit positions out of a total of ten.

In step 12, the number of good cells is determined simply by counting the number of error syndromes which are 0's. If there are 1024 good cells, as determined by the test of step 13, then as indicated in step 14 a print-out is controlled to indicate that the chip is perfect. The system then goes back to step 2 which, as will be described below, controls the setting up of a new chip for testing and the print-out of its chip identification number. On the other hand, if the chip is not perfect, before the applicable quarter-partial categories are determined, a test is performed to verify that there is a possiblity that at least one such category exists. For such a category to exist, there must be at least 256 good cells. If the result of the test indicated at step 15 is that there are less than 256 good cells, then a print-out is made that no partial categories are applicable to the chip, and a return is made to step 2 at which time a new chip is moved into place to be tested.

If there are 256 or more good cells, then beginning with step 17 the applicable quarter-partial chip categories are determined. As mentioned above, the identification of the 180 quarter-partial categories can be broken down into two aspects. First, the two address bits which are held at fixed values for the quarter-partial categories are represented by the 45 masks. For each of these masks, the values of the two fixed bits can be any one of four different combinations. There are 45 four-bit words which are associated with the 45 masks. These words are called "partial syndromes" in the method of FIGS. 2–4. Suppose for example, that mask 0010000100 is considered, and that this mask is designated as mask 43. Partial syndrome number 43 is a four-bit word, with each bit corresponding to one of the four two-bit combinations for the two positions in the mask which contain 1's. The rightmost bit in the partial syndrome corresponds to a 11 combination (where the leftmost bit value corresponds to the leftmost bit position in the mask containing a 1, and the rightmost bit value corresponds to the rightmost bit position in the mask containing a 1), the next least significant bit corresponds to a 00 bit combination, the third rightmost bit correspondence to a 01 combination and the leftmost bit corresponds to a 10 combination. Initially, all four bit positions of the partial syndrome contain 0's to indicate that the two address lines identified by the 1's in mask 43 can be held at any one of the four combinations of fixed potentials and the chip will function as a quarter-partial chip. Whenever it is determined that one of the bit combinations cannot be used because if the other eight address bits are cycled they will cause a bad cell to be selected, a 1 is placed in the corresponding bit position in partial syndrome 43. If at the end of the overall procedure partial syndrome 43 is 0101, then it is an indication that for the two address lines corresponding to the 1's in mask 43 to be held at fixed potentials in order that the chip be used as a quarter-partial, these two address lines can represent a 10 combination or a 00 combination. In either case, as the eight other address lines are cycled, 256 good cells will be addressed. If the two address lines of interest are held at either 01 or 11 levels, then the cycling of the eight other address lines in each case will cause at least one bad cell to be addressed.

In step 17, all 45 partial syndromes are set to zero (0000); it is assumed that all 180 quarter-partisl categories are applicable to each chip. Starting with step 18, the inapplicable quarter-partial categories are eliminated. All 1024 cell addresses must be operated upon. In step 18, an index number representing the cell address is set to zero so that the address of the first cell will be processed. In step 19, the error syndrome for this cell is examined. If it is a 0, indicating the cell is good, there is no need to eliminate any quarter-partial categories. As indicated in step 20, a jump is made to step 37. Referring to FIG. 3, in step 37 the cell address is incremented and, as will be described, the next cell address then is operated upon. On the other hand, if the error syndrome for the cell whose address is being operated upon is not 0, it is necessary to eliminate 45 quarter-partial categories.

The reason why 45 partial-categories must be eliminated for each bad cell is as follows. Suppose the address of the bad cell is 0011100011. This means that if any two of the address lines are held at fixed potentials corresponding to respective bit values of the address, then during the cycling of the eight other address bits the bad cell will be identified. Since this must not occur, the two address lines cannot be held at potentials corresponding to the respective bit values in the address of the bad cell. For example, consider just the leftmost and rightmost address bits. The 01 combination in these two bit positions of the cell address mean that it is not possible to use the chip as a quarter-partial if the most significant address line is held at a potential corresponding to a 0 and the least significant address line is held at a potential corresponding to a 1. As another example, the 00 combination in the two leftmost bit positions of the address eliminate the possibility of maintaining the two most significant address lines at potentials corresponding to 0' s. Since there are 45 combinations of two positions out of a total of 10, it is apparent that each bad cell causes 45 quarter-partial categories to be eliminated. Of course, the same quarter-partial category can be eliminated when the addresses of many bad cells are operated upon, but by operating upon the address of every bad cell in the same manner, it is insured that all of the inapplicable quarter-partial categories are eliminated.

In order that all 45 inapplicable categories be eliminated each time that an address of a bad cell is operated upon, it is necessary to consider each of the 45 combinations of two bit positions in the address, and for each combination to examine the values of the bits in the two bit positions so that the correct one of the four partial categories associated with the two-position combination can be eliminated. This is done in two groups of sub-steps. First, each of the 45 masks is used to isolate the values of the address bits in the respective two positions of the address (these positions corresponding to the 1's in the mask). Thereafter, the bit values in these two positions are examined to eliminate one of the four possible quarter-partial categories associated with that mask.

Since all 45 masks must be used, an index I is used to identify the mask to be operated upon. In step 21, I is set to zero. In step 22, mask I is fetched. As will be described below, after each inapplicable quarter-partial category is eliminated, I is incremented and a return is made to step 22 so that the next mask is fetched and used to control the elimination of another category. In step 23, the address of the bad cell is masked by mask I. Consider the case of the following mask: 0000100100. The address of the cell being operated upon is stored in memory, and it is now masked by the mask under consideration. The cell address itself remains in memory since it is needed later on in the process; but at this time the masked address is formed since it too is used. Suppose that the address of the cell being operated upon is that considered above: 0011100011. When this address is masked by mask 0000100100, the masked address is 0000100000. In this designation, the bars underneath two of the bit values correspond to the positions in the mask I which contain 1's. The masked address in each case is a ten-bit word which contains at least eight 0's but can contain 10 0's. In order to determine which of the inapplicable quarter-partial categories should be eliminated, it is necessary to operate upon the mask itself to determine which two of its positions contain 1's.

In step 24, the mask is shifted to the right (typically in the accumulator of the machine) until a 1 appears in the low-order position. The number of shifts required to set up this condition is counted and a number $n$ is set equal to it. (In the case of a 1 in the rightmost position of the mask, $n=0$.) In step 25, the mask is shifted to the right by one position. In step 26, the mask is once again shifted to the right until a 1 appears in the low-order position. The number of shifts required to set up this condition is counted and a value $m$ is set equal to it.

The two numbers of interest after the three shifts are $(n+1)$ and $(n+m+2)$. The number $(n+1)$ represents the position of the rightmost 1 in the mask. For example, suppose that the rightmost position in the mask contains a 1. In this case, $n=0$ and $(n+1)$ equals 1 to indicate that the rightmost 1 is in position 1 of the mask. On the other hand, suppose that the rightmost 1 is in position 4. In such a case, in step 24, three shifts are required to set a 1 in the low-order position of the shifted mask, and the number $(n+1)$ is a 4 as required. Suppose that the leftmost 1 is in position 5 of this same mask. In such a case, after the rightmost 1 (originally in position 4) is in the low-order position of the shifted mask, in step 25 the 1 which was originally in position 5 is shifted by one position to the low-order position of the shifted mask. In such a case, no shifts are required in step 26 and $m=0$. Consequently, the value $(n+m+2)$ equals $(3+0+2)$, or 5, to represent that position 5 contains the leftmost 1 in the mask.

As another example, consider that position 3 contains the rightmost 1 and position 7 contains the leftmost 1. In such a case, $n=2$ and following the execution of step 25, the original leftmost 1 is in the fourth position from the right in the shifted mask. Consequently, in step 26 three shifts are required to get this 1 in the low-order position in the shifted mask, and $m=2$. Thus, $(n+m+2) = (2+3+2) = 7$ as required. In general, as a result of steps 24–26, the value $(n+1)$ represents the position of the rightmost 1 in the mask and the value $(n+m+2)$ represents the position of the leftmost 1 in the mask.

Steps 27–33 are used to determine which of the four bits in the partial syndrome corresponding to the mask being operated upon should be set to a 1. In step 27, bit $(n+1)$ in the masked address is examined. If it is a 0, a branch is made to step 29. The value of bit $(n+m+2)$ in the masked address is then examined. If it is also a 0, a branch is made to step 33. As a result of the "yes" answers to both questions in steps 27 and 29, it has been determined that the bit combination which cannot be used for the two address lines represented by mask I is 00. This bit combination is represented by the second rightmost bit in the four-bit partial syndrome corresponding to mask I. Consequently, in step 33 bit 2 in partial syndrome I is set to a 1 so that the corresponding quarter-partial category is eliminated. Similary, if the answer to the question in step 27 is a "yes" but the answer to the question in step 29 is a "no," then in step 32 bit four in partial syndrome I is set to a 1. This causes the combination 10 for the two address lines corresponding to mask I to be eliminated. On the other hand, if the rightmost bit in the masked address is a 0, then, following step 27, step 28 is executed. Step 28 is the same as step 29 and simply entails an examination of the value of the bit in the address of the cell corresponding to the leftmost 1 in mask I. Depending on the value of this bit, one of steps 30 and 31 is executed and either bit 1 or bit 3 in partial syndrome I is set to a 1. (It should be noted that in steps 27–29 bit values in the cell address itself can be examined, rather than bit values in the masked address, since for the two positions of interest the bit values in both words are the same.)

After one of steps 30–33 has been executed, in step 34 index I is incremented. This is done in preparation for the examination of the next mask and the elimination of another quarter-partial category. In step 35, a test is made to determine whether I=46. If it does not equal 46, step 36 is executed and it simply causes a return to step 22. Since index I has been incremented, in step 22 the next mask is fetched and the following steps cause another quarter-partial category to be eliminated. On the other hand, if the answer to the question in step 35 is in the affirmative, it is an indication that all 45 masks have been operated upon and that 45 quarter-partial categories have been eliminated for the address of the bad cell under consideration. It is now necessary to operate upon the next address. The cell address is incremented in step 37 and in step 38 a test is made to determine whether the incremented cell address is equal to 1025. If it is not, step 39 controls a return to step 19. In step 19, the error syndrome for the cell address is examined. If it is a 0 indicating that the cell is good, step 20 causes a branch to step 37, that is, the cell address is once again incremented since no quarter-partial categories need be eliminated for the cell under consideration. On the other hand, if the answer to the question in step 19 is in the negative, all 45masks are examined once again so that the 45 inapplicable quarter-partial categories can be eliminated. This process continues until the answer to the question in step 38 is in the affirmative. Since there are only 1024 cells on each chip, when the cell address represents the number 1025 it is an indication that the addresses of all bad cells have been operated upon. It is at this time that all of the information appropriate to the chip is printed out.

It must be recalled that there are 45 four-bit partial syndromes. If any partial syndrome is 1111, it is an indication that there is no bit combination that can be used for the two address lines corresponding to the respective mask. If all 45 partial syndromes are 1111 (decimal 15), then there are no quarter-partial categories applicable to the chip. In step 40, all 45 partial syndromes are examined and if there is not one partial syndrome which is less than 15, then in step 41 the lack of any quarter-partial categories is printed out and a return is made to step 2 at which time a new chip is set up for testing. On the other hand, if there is at least one partial syndrome whose decimal value is less than 15, then there is at least one quarter-partial category applicable to the chip, and starting with step 42 all of the applicable categories are printed.

The print-out consists of a list of ten-position words. Each word has eight X's, with the two other bit positions containing one of the four combination 00, 11, 01, and 10. For example, a print-out of XXXX1XX0XX means that if the third address line is wired to a bit value of 0 and the sixth address line is wired to a value of 1, then as the other eight address lines are cycled 256 good cells will be addressed. To control the print-out of the entire list, each of the 45 partial syndromes is operated upon. The number of each partial syndrome, of course, represents which of the two positions in the corresponding print-out should not be "X'ed." The value of the four-bit partial syndrome represents how many print-outs are required. For example, if the partial syndrome is 1111, there are no applicable quarter-partial categories and no print-out is required. On the other hand, if the partial syndrome is 0000, the maximum of four print-outs is required.

In step 42, an index J is set to 1. The value of J represents the partial syndrome being operated upon. In step 43, the partial syndrome J is examined to see if it is 1111 (decimal 15). If it is, step 44 controls a branch to step 69, at which time J is incremented so that the next partial syndrome can be operated upon. If the partial syndrome is less than 15, then in step 45 mask J is fetched. The mask must be fetched in order to determine the two positions in the print-out which should not contain X's.

All four bits in the partial syndrome must be examined since any bit which is a 0 controls a print-out. An index K (representing a bit position in a partial syndrome) is set equal to 1 in step 46, and in step 47 the bit value in position K of partial syndrome J is examined. If it is not a 0, it is an indication that the associated quarter-partial category is not available and in step 48 a branch is made to step 66. In step 66, K is incremented, and in step 67 it is tested to determine whether it is equal to five. If it is equal to five, then step 69 is executed — all four bit positions in the partial syndrome have been examined and have controlled respective print-outs, and the next partial syndrome is operated upon by incrementing J. On the other hand, if as a result of the test in step 67 it is determined that K is less than five, step 68 causes a return to step 47. Each time step 47 is executed, if it is determined that the value of the bit in position K is a 0, then it is necessary to control a print-out. But the print-out itself depends on the value of K. For example, it will be recalled that if bit two of the partial syndrome is a 0, then the bit combination for the two address lines whose potentials can be fixed is 00. In step 49, K is tested to see if it is a 1. If it is, step 50 is executed. If K is a 1, it means that the valid quarter-partial category requires a 11 combination in the two positions represented by the 1's in the mask being operated upon. Two numbers A and B are used to control the values of the two numbers printed in the non-X positions in the print-out. The number A corresponds to the leftmost value and the number B corresponds to the rightmost value. In step 50, both numbers are set to 1 since the applicable quarter-partial category is for a 11 combination.

If K is not equal to 1, then in step 51 it is examined to see if it is equal to 2. If it is, since the value in bit position 2 of the partial syndrome is a 0 (as determined by the test in step 47), the 00 combination should be printed. Both A and B are set to 0. On the other, if K does not equal 2, in step 53 a test is performed to see if it is equal to 3. If it is, it is an indication that the 01 combination is that which should be printed. In such a case, A is not equal to 0 and B is set equal to 1. Finally, if the value of K is not equal to 3, it must be equal to 4; the combination to be printed is 10 and thus A is set equal to 1 and B is set equal to 0.

After the values of A and B have been set, in step 56 a value M is set equal to the value of A. The value M is the number which is actually printed in each non-X position. Since the print-out is from left to right, the first value which is printed is value A.

In step 57, index L is set equal to ten. The value L simply represents the position, from left to right, in each 10-position print-out, with a value of 10 corresponding to the leftmost position and a value of 1 corresponding to the rightmost position.

After L has been set to ten, an X, a 1 or a 0 is printed in the first position of the next entry to be made in the list. In step 58, the mask J being operated upon is examined and if bit L (initially the leftmost bit since $L=10$) is a 0, and X should be printed since address line 10 is not one of those to be held at a fixed potential if the chip is used as a quarter-partial of the type to be printed. In step 59, an X is printed and immediately thereafter step 62 is executed. The value of L is decremented and in step 63 it is examined to see if it is a 0. If it is not, a return is made to step 58 to control the print-out of the next X, 1 or 0 in the 10-position word. This process continues until the first time that L has a value whose corresponding position in mask J contains a 1. At such a time, the result of the test in step 58 is negative and step 60 is executed. The value of M is printed out, and since M has been set in step 56 to the value of A, the leftmost required bit value is printed. Immediately thereafter, during step 61, M is set equal to B, so that the next time the value of M is printed, the rightmost 1 or 0 value for the quarter-partial category being printed will appear in the 10-position word. In step 62, L is decremented just as it is after an X is printed. In step 63, L is examined to see if it is a 0 in the usual manner. It should be noted that even after the values for A and B have been printed, it is still necessary to return to step 58 and print out additional X's until a complete 10-position word appears on the paper. Of course, after the value of B is printed, for each of the succeeding values of L the corresponding bit position in mask J contains a 0 so that only X's are printed.

As soon as the result of the test in step 63 is positive, it is an indication that the last print-out was in bit position 1 of the word and that the print-out for this word is complete. In step 65, the paper is advanced so that the next print-out will appear directly beneath the previous one. In step 66, the value of K is incremented as described above. As a result of the test in step 67, it may be determined that there may yet be another applicable quarter-partial associated with mask J whose identity should be printed, in which case a return is made to step 47 to see if the bit value in position K of partial syndrome J is a 0. On the other hand, if K is equal to five, all four bits in partial syndrome J have been examined and at least one word print-out has been made for partial syndrome J. In step 69, the value of J is incremented so that the next partial syndrome can be operated upon. In step 70, a test is made to see if all 45 partial syndromes have been examined and have resulted in the appropriate print-outs. If J does not equal 46, a return is made to step 43; the incremented value of J is used to control the examination of the next partial syndrome and the appropriate print-outs. Finally, when all 45 partial syndromes have been used to control their respective print-outs, the answer to the question in step 70 is in the affirmative and a return is made to step 2; another chip is set up for testing, determination of applicable quarter-partial categories, and control of the necessary print-outs.

The final list is of the following form:

XXXX1XX1XX
XXXX1XX0XX
XXX0X0XXXX
X01XXXXXXX

Each 10-position print-out identifies an applicable quarter-partial. The non-X positions in each case represent the address lines to which fixed potential may be applied. The values of the potentials are determined by the 0 and 1 values in the non-X positions.

As described above, FIG. 1 depicts the steps for actually testing the cells on each slip to determine which are the bad cells. The method of my invention can be practiced on an automatic tester which is suitable for testing memory chips. A particular tester which can be used is the PAFT II (programmable automatic function tester) manufactured by the Redcor Corporation of Canoga Park, California, used in conjunction with Electroglas test probes. The PAFT II tester performs both functional and parametric tests on MOS/LSI devices by generating (under computer control) program-selectable clocks, strobes, input/output patterns, and voltage levels that automatically execute pass/fail tests on a given device under test. The PAFT II system includes an RC 70 general purpose digital computer, and the system is thus ideally suited for the practice of my invention in which the algorithm for determining partial categories is performed while the chip previously tested is being removed and a new chip is being moved under the test probes.

In the first step of the program, the input test sequences are fed into the computer, along with the masks required for the partial category determinations. (Only the test sequences are shown in step 1 of FIG. 1, the 45 masks simply being based on all 2-position combinations out of ten.) The first "test" (WO) consists of the writing of a 0 in each of the (N+1) cells on a chip. (The numbers 0–N identify N+1 cells.) The cells are addressed successively in descending order (N–0). During this first sequence, no bits are read from the cells.

In the second sequence, each cell is operated on as follows: the cell is first read to verify that a 0 was written in it during the first sequence (RO). Then a 1 is written into the cell (W1); the cell is then read to see that the 1 was indeed written in it (R1). These operations are symbolized by the notation R0, W1, R1. All three operations are performed on each cell before the system advances to test the next cell. The cells are addressed in ascending order. During the third test, the 1 written in each cell at the end of the second sequence is read from the cell (R1), following which is 0 is written into the cell (W0) and then read (R0). Again, the cells are operated upon in sequence, in ascending order.

During the fourth test sequence, the 0 previously written in each cell is read (R0) and a 1 is then written (W1). During the fourth test sequence, the cells are operated upon in sequence, in descending order (N—0).

Finally, during the fifth test sequence, the 1 previously written in each cell is read (R1), following which a 0 is written into the cell (W0). Once again, the cells are operated upon in descending order.

This type of test sequence not only tests that 0's and 1's are properly written into and read out of cells, it also performs the tests such that if the cells interact with each other to produce erroneous results the interactions are detected. This will become apparent below.

After the test sequences are fed into the machine (but before they are performed on any cells) the first chip is set up under the test probes. This is shown as step 2 in the flow chart. The chip identification is also printed; thus each quarter-partial category list follows a chip number. Also, the paper is advanced after the print-out in preparation for the first word in the list.

An area of the computer memory is then set aside to represent error syndromes. There are N+1 error syndromes and all of them are initially set in the 0 state. Before testing any chip, it is presumed to be perfect.

In the fourth step of the program, the first test sequence (W0) is performed on all of the cells, after which the second test sequence (R0, W1, R1) is performed. In step 5, the computer stores the results of the R0 and R1 tests; any failure (e.g., the reading of a 1 when a 0 should have been read) results in the cell error syndrome of the inoperative cell being set to a 1. In step 6, the third test sequence (R1, W0, R0) is performed and the results are temporarily stored. In step 7, the error syndrome for each cell is set to a 1 (if it is not already a 1) if either of the R1 and R0 tests was failed by the cell.

In step 8, the fourth test sequence (R0, W1) is performed and the results of the R0 test are temporarily stored; in step 9, the error syndrome for any cell is set to a 1 if the R0 test was failed.

Finally, in the 10th and 11th steps, the fifth test sequence (R1, W0) is performed and if the R1 test fails on any cell, the error syndrome for that cell is set to a 1.

To appreciate that these test sequences check for all failure modes of interest, it is necessary to analyze the several well-defined failure modes for monolithic memory devices. The following list describes them:

1. Stuck Cell — A selected memory cell (bit) cannot be switched from its stuck state. A cell can be stuck in either the 1 state (S1) or the 0 state (S0).
2. Multiple Addressing (MA) — More than one cell is selected by a particular address.
3. Write 1 disturbs 1 (W1D1) — Writing a 1 in one cell switches a 1 in another cell to a 0.
4. Write 1 disturbs 0 (W1D0) — Writing a 1 in one cell switches a 0 in another cell to a 1.
5. Write 0 disturbs 1 (W0D1) — Writing a 0 in one cell switches a 1 in another cell to a 0.
6. Write 0 disturbs 0 (W0D0) — Writing a 0 in one cell switches a 0 in another cell to a 1.
7. Read 1 disturbs 1 (R1D1) — Reading a 1 from one cell switches a 1 in another cell to a 0.
8. Read 1 disturbs 0 (R1D0) — Reading a 1 from one cell switches a 0 in another cell to a 1.
9. Read 0 disturbs 1 (R0D1) — Reading a 0 from one cell switches a 1 in another cell to a 0.
10. Read 0 disturbs 0 (R0D0) — Reading a 0 from one cell switches a 0 in another cell to a 1.
11. Slow Bit Recovery (Recovery) — A read operation following a write operation (on the same cell fails.
12. Slow Access Time (Access) — The response of the device to a read operation is too slow.

The relative frequencies of occurence of the various failure modes necessarily vary from chip type to chip type. In at least one case, the relative frequencies of occurence of the various failure modes were as follows:

| FAILURE MODE | % OF ALL FAILURES |
|---|---|
| Stucks | 50% |
| Multiple Addressing | 20% |
| Disturbs | 5% |
| Recovery, Access | 1% |
| Combinations | 24% |

By "combinations" is means combinations of the other types of failure modes. It is expected that the data in the above table is representative of monolithic memory devices in general.

The test sequences include six read operations at each memory address. The following Table indicates the six read operations and the possible failure modes of a particular cell which could cause each test to fail. In the Table two special symbols are used. The symbol (<) means that a lower-address cell affects the contents of a higher-address cell and causes a test failure when the higher-address cell is operated upon, while the symbol (<) means that an operation on a higher-address cell affects the content of a lower-address cell and causes a test failure when the lower-address cell is operated upon. For example, the code W1D0 (>) means that when a 1 is written in a higher-address cell, it erroneously results in the switching of a 0 in a lower-address cell to a 1.

| Read Sequence Number | Read Operation | POSSIBLE FAILURE MODES |
|---|---|---|
| 1 | **R0** | **S1, W1D0** (<), **W0D0** (<), **R1D0** (<), **R0D0** (<), **MA** (<) |
| 2 | **R1** | **S0**, Recovery |
| 3 | **R1** | **S0, MA** (<), **W0D1** (<), **R0D1** (<), **R1D1** (<),**W1D1** (>), **R0D1** (>), **R1D1** (<) |
| 4 | **R0** | **S1**, Recovery |
| 5 | **R0** | **S1, MA** (>), **W0D0** (>), **R0D0** (>), **W1D0** (>) |
| 6 | **R1** | **S0, MA** (>), **R0D1** (<), **W1D1** (<), **R1D1** (>), **W0D1** (>) |

It is important at this stage to understand how each of the possible failure modes results in the failures of the tests indicated in the Table. When the first R0 read test is performed on any cell, if the cell is stuck in the 1 state it is apparent that the test will be failed. For this reason, the Table indicates that an S1 failure mode results from a failure of the first R0 test.

During the first test sequence, a 0 is written in each of the cells. During the second test sequence, each cell is operated upon and during the course of the operations on the cell a 1 is written into it. If the writing of this 1 bit disturbs the 0 previously written in some other cell with a higher address, then when this cell with a higher address is first read when the second test sequence is performed on it, instead of a 0 being read, a 1 will be read. It is for this reason that the entry W1D0 (<) is included in the first row of the Table — when the higher address cell is first read during the second test sequence, if the writing of a 1 in a lower address cell also caused a 1 to be written in the higher address cell, the first R0 test will be failed. Similarly, the other two operations performed on each cell during the second test sequence are R0 and R1. If either of these two operations on a lower address cell disturbs the 0 in a higher address cell, then when the higher address cell is first sensed when the second test sequence is performed on it, a 1 will be read rather than a 0. It is for this reason that the two entries R1D0 (<) and R0D0 (<) are included in the first row of the Table.

The W0D0 (<) entry is included for another reason. When the first test sequence (W0) is performed on all of the cells as they are addressed in descending order, 0's are written into them. If the writing of a 0 in a lower address cell causes a 1 to be written in a higher address cell (after that higher address cell has been set in the 0 state), then when the higher address cell is first read during the second test sequence a 0 will not be sensed as it should be. This is an indication that the writing of a 0 in a lower address cell disturbed a 0 in a higher address cell — a failure mode of the type W0D0 (<).

The second operation performed on each cell during the second test sequence is the writing of a 1. The cells are operated upon in ascending order. If the writing of a 1 in a lower address cell also causes a 1 to be written in a higher address cell, then when this higher address cell is first read (R0) a 1 will be sensed rather than the 0 which should be. This situation arises because the addressing of a lower number cell causes both that cell and the higher number cell to be selected, a failure mode of MA (<). When the higher number cell is operated upon, an error will be detected and thus the entry MA (<) is included in the first row of the Table.

All of the entries in the first row of the Table result from the failure of the R0 test during the second sequence on each cell; the reading of a 1 in any cell instead of a 0 at the beginning of the second test sequence on that cell can result from any one of the six failure modes listed in the Table.

If any cell is stuck in the 0 state, then during the R1 operation a 0 will be sensed rather than a 1. It is for this reason that the S0 entry is made in the second line of the Table. It should also be noted that in the second test sequence when each cell is operated upon a 1 is written into it and is then read out immediately. If there is a recovery problem with the cell, the 1 bit will not be sensed. It is for this reason that the "Recovery" entry is made in the second line of the Table.

During the third test sequence, the state of each cell is first sensed to see if it is still a 1 (R1). If it is not, it may be that the cell is stuck in the 0 state; thus, the SO failure mode is associated with the third (R1) read test.

The second operation performed on each cell during the third test sequence is the writing of a 0. The cells are operated upon in ascending order. If the writing of a 0 in a lower address cell also causes a 0 to be written in a higher address cell, then when this higher address cell is first read a 0 will be sensed rather than the 1 which should be. This situation arises either because the addressing of a lower number cell causes both that cell and the higher number cell to be selected, a failure mode of MA (<), or because the writing of a 0 in a lower number cell disturbs the 1 in a higher number cell, a failure mode W0D1 (<). Accordingly, both entries appear in row 3 of the Table.

The first and last operations in the third test sequence are the reading of a 1 and the reading of a 0. If either operation disturbs the 1 in a higher address cell, then when this higher address cell is first operated upon with the third test sequence a 0 will be read rather than a 1. It is for this reason that row 3 of the Table includes R1D1 (<) and R0D1 (<) entries.

The second sequence is performed on the cells in ascending order, and each cell should be left in the 1 state. But if any one of the three operations on a higher number cell disturbs the 1 in a lower number cell, the R1 test in the third sequence will be failed when this lower number cell is operated upon. Accordingly, the third row of the Table includes R0D1 (<), W1D1 (<) and R1D1 (<) entries.

The failure of the R0 test in the third sequence can arise from a cell being stuck in the 1 state, or the difficulty in reading a 0 immediately after it is written (since the third sequence includes a W0, R0 combination). Thus the fourth row of the Table includes two entries — S1 and Recovery.

During the third test sequence on any cell, a 0 is written into it, and this 0 should be detected when the cell is first examined at the start of the fourth sequence. The third sequence is performed on the cells in ascending order and it is possible for any one of the R2, W0, and R0 operations to disturb the 0 in a lower number cell. The failure will be detected when the R0 test in the fourth sequence is performed on the lower number cell. It is for this reason that the fifth row of the Table, in addition to the S1 entry for any R0 test, includes R1D0 (<), W0D0 (<) and R0D0 (<) entries.

The fourth sequence is performed on the cells in descending order. If the W1 operation on a cell disturbs a 0 in a lower number cell, when the R0 test in the fourth sequence is performed on this cell, a 1 will be read. Thus, the W1D0 (<) entry is included in the fifth row of the Table. But rather than simply disturbing the 0 in a lower number cell, the addressing of a higher number cell may also result in the simultaneous addressing of a lower number cell, a 1 being written in both cells at the same time. It is for this reason that the fifth read test also picks up an MA (>) failure.

The R1, W0 combination in the fifth sequence functions as does the R0, W1 combination in the fourth sequence to give rise to an MA (>) failure. The sixth row of the Table includes this entry, along with the S0 entry always associated with an R1 test. At the end of the fourth sequence on each cell, the cell should be left in the 1 state. But if either of the R0 or W1 operations in the fourth sequence, when performed on a lower address cell, disturbs the 1 previously written in a higher address cell, the R1 test in the fifth sequence, when performed on the higher address cell, will be failed. Thus the sixth read test (R1) is failed if there is an R0D1 (<) or W1D1 (<) problem, as indicated in the Table.

Finally, since the fifth sequence is performed on the cells in descending order, either of the R1 or W0 operations on a higher address cell can disturb the 1 in a lower address cell, a 0 then being read instead of the expected 1 when the lower address cell is first read during the fifth sequence. The last two entries in the Table are thus R1D1 (>) and W0D1 (>).

The failure modes which are listed in the Table as giving rise to at least one of the six read test failures include S0, S1, Recovery, MA (>), MA (<), and all eight possible "disturbs." The only failure mode of interest not listed in "Access." But, in fact, the speed of response of a cell to a read operation is tested for six times, since there are six read tests. Thus, an "Access" problem certainly results in at least one test failure, as desired.

While all failure modes of interest are detected by the sequences of FIG. 1, other sequences are known for accomplishing this result. The uniqueness of the five sequences of FIG. 1, in the order illustrated, is that they allow all failure modes of interest to be detected, while the actual number of test operations is the smallest possible. The test pattern should be compared to prior art test patterns in this regard.

The brute-force approach to the testing of cells results in a group of test sequences such as the following:

1. W0 — O–N
2. W1$^0$, R$^0$, W0$^0$, R0$^0$ —0–N
3. W1 — O–N
4. W0$^1$, R0$^1$, W1$^1$, R1$^1$ — 0–N

What is done here is first to write a 0 in every cell (step 1). Step 2 is then performed for cell 0. A 1 is written into it, following which all other cells are checked to see that they still contain 0's. This is represented by the notation W1$^0$. Then cell 0 is read to see if it still contains the 1 previously written into it, after which all other cells are checked to see if they still contain 0's (R1$^0$). A 0 is then written into cell 0 followed by a check on all other cells (W0$^0$), and finally a 0 is read out of cell 0 and then out of all other cells (R0$^0$). The whole cycle is then repeated for cell 1, the W1, R1, W0 and R0 operations being performed on this cell with all of cells 0 and 2–N being checked to see if they contain 0's after each of the four operations on cell 1. Similar operations are then performed on the other cells. Steps 3 and 4 are the same as steps 1 and 2 except that 1's and 0's are interchanged in the sequences. The total number of read and write operations for (N+1) cells is $2(N+1) + 8(N+1)^2$, a very large number.

In sophisticated testers, the brute-force approach is seldom used. Instead, various test sequences have been designed for reducing the total number of operations required to fully test all cells on a chip. A relatively commonly used test routine is disclosed in my above-identified application Ser. No. 61,674. This sequence is as follows:

1. W0 —0–N
2. R0, W1, R1, W0 — 0–N
3. R0, W1 — 0–N
4. R1, W0, R0, W1 — N–0
5. R1, W0 — N–0

A total of 13 operations must be performed on each cell tested by this routine in order to check for all possible failures. In accordance with the routine of my invention, however, only eleven operations on each cell are required to do the same job.

Although in FIG. 1 particular test sequences are shown, the particular example is only illustrative of a group of test sequence patterns which can be formulated in accordance with rules which I have discovered. The first thing to be noticed is that the R1 and R0 operations at the ends of sequences 2 and 3 are included only for bit-recovery test purposes. When the second sequence is performed on each cell, during the second operation of the sequence a 1 is written in the cell. The cell is read immediately thereafter to check the bit-recovery time. Although the R1 step also allows the R1D1 (>) value mode to be checked for when the third test sequence is performed on each cell, the R1 operation at the end of step 2 is not really necessary for this purpose inasmuch as the sixth read test also picks up errors of this type. As for the R0 operation at the end of the third sequence, it serves only to check the bit-recovery time. IF bit-recovery failures are not suspected, then the basic test sequence reduces to nine operations, the R1 and R0 operations at the ends of the second and third sequences being omitted.

With respect to this basic test pattern, it is evident that all 0 and 1 designations can be reversed. Ignoring for the moment the ascending or descending order in which the cells are operated upon, the basic test pattern of my invention is as follows (where the value X represents either a 1 or 0 bit, and the value $\bar{X}$ represents a bit of opposite value):

1. WX
2. RX, W$\bar{X}$
3. R$\bar{X}$, WX
4. RX, W$\bar{X}$
5. R$\bar{X}$, WX

As for the order of the addressing, there are four possibilities. In general, either the cells must be addressed in the same order (ascending or descending) for steps 2 and 3, and in the opposite order for steps 1, 4 and 5, or they must be addressed in the same order for steps 3 and 4, and in the opposite order for steps 1, 2 and 5. There are thus four possible order sequences as follows (where 0–N represents an ascending order and N–0 represents a descending order):

| | 1st Order | 2nd Order | 3rd Order | 4th Order |
|---|---|---|---|---|
| 1. | 0-N | N-0 | N-0 | 0-N |
| 2. | N-0 | 0-N | N-0 | 0-N |
| 3. | N-0 | 0-N | 0-N | N-0 |
| 4. | 0-N | N-0 | 0-N | N-0 |
| 5. | 0-N | N-0 | N-0 | 0-N |

In addition to the first two rules (the basic R/W pattern and the addressing order), there is a third rule which pertains to bit-recovery tests if they are desired. Simply stated, an RX operation is required after any WX operation and an R$\bar{X}$ operation is required after any W$\bar{X}$ operation; the R$\bar{X}$ operation for the bit-recovery test can be at the end of either step 2 or 4, and the RX operation can be at the end of either step 3 or 5. Thus there are four combinations which can be used for testing bit-recovery failures.

All in all, since there are two basic test sequences (for X=1 and X=0), four addressing orders, and four bit-recovery test groupings, there is a total of 32 possible test patterns — each requiring eleven operations on each cell — to test for all possible failure modes of interest.

FIG. 5 illustrates apparatus for testing the cells of a chip; the apparatus has less flexibility than expensive automatic testers. However, because of the use of inner and outer address counters 16, 18 and intermediate flip-flops 20, 22 complete testing of a chip can be accomplished with a tester of very low cost.

The system operation is controlled by timing and control circuits 24. Although a small computer can be used for this purpose, in many cases so little flexibility is required that simple timing and control circuits can be built for a particular application; the design of special-purpose timing and control circuits will be apparent to those skilled in the art in view of the description below of the functions which they control.

Clock pulses are applied over conductor 82 to the input of inner address counter 16. This counter cycles from 0 through N, where (N+1) is the number of cells on a chip to be tested. After a count of N is reached, the inner address counter is reset to 0 and a carry is extended over conductor 58 to the input of flip-flop 20. Flip-flops 20, 22 comprise two intermediate stages (X, Y) in an overall counter chain which includes elements 16, 20, 22, 18 and 26. The carry output of flip-flop 22 is extended to the input of outer address counter 18 which also cycles through a total count equal to the number of cells on the chip. The carry output of counter 18 is extended to the input of flip-flop 26, which functions as the last stage (0) in the overall counter. The state of stage 26 is represented on conductor 80 extended to timing and control circuits 24. The timing and control circuits are also informed of the states of stages X and Y over conductors 62, 64. All stages of the counter can be reset by the timing and control circuits with the application of a reset pulse to conductor 86 which is extended to the reset inputs of all stages.

The count in counter 16 is extended over cable 46 to a plurality of gates 12. (All heavy lines in the circuit of FIG. 5, such as that designated by the numeral 46, represent cables over which parallel bits are transmitted.) Whenever conductor 54 is energized by timing and control circuits 24, gates 12 operate to transmit the address on cable 46 through the gates and over cable 42 to buffer/drivers 10. These buffer/drivers function as OR gates to transmit the address on cable 42 over cable 40 to pin interface unit 30. The pin interface unit simply serves to connect the pins of the device (e.g., a module 32) under test to conductor 78, and cables 40, 68. The address bits on cable 40 identify a particular cell on the chip. Similarly, when conductor 56 is energized by timing and control circuits 24, gates 14 operate to transmit the address in counter 18 over cables 48, 44 and 40 to pin interface unit 30. Thus the address represented by either one of counters 16, 18 can be used to select a cell depending on which of conductors 54, 56 is energized by the timing and control circuits.

Timing and control circuits 24 transmit data, clock and control information over cable 56 to buffer/drivers 28. The buffer/drivers extend the necessary signals over cable 68 to pin interface unit 30 to control reading and writing in the cells. For example, one of the signals transmitted indicates whether a read or write operation is to be performed, another represents the value of a data bit to be written, etc. Whenever a cell is read, the bit value is transmitted over conductor 78 to error comparator 34.

Timing and control circuits 24 extend a bit value over conductor 70 to the error comparator which indicates the value of the bit which should ordinarily be read during a sequence of tests. Whenever an error is detected, a signal is generated on conductor 76. But, as will become apparent below, while the use of inner and outer address counters facilitates the automatic addressing of cells in the proper sequence without elaborate programming, there also results situations where "errors" will necessarily be detected even if the chip is perfect. Fortunately, however, as will become apparent below, "error" signals appear on conductor 76 when in reality there are no errors only when the addresses stored in the inner and outer address counters are the same. For this reason, the two addresses are extended over respective cables 50, 52 to the inputs of address comparator 36. The output conductor 72 of this comparator is normally energized to enable error flag gate 38. Consequently, under ordinary circumstances an error signal on conductor 76 is extended through the error flag gate and over conductor 74 to timing and control circuits 24 to notify the latter than an error has been detected. However, whenever the two addresses in the counters match, address comparator 36 disables error flag gate 38 so that an "erroneous" error signal is not transmitted to the timing and control circuits.

The operation of the system can be understood with reference to an illustrative test sequence. In this sequence, the notation W0; O—N, for example, refers to the writing of a 0 in each cell, with the cells being operated upon in ascending order. However, a notation such as $R0^0$, $W1^0$, $R1^1$, $W0^0$; 0—N refers to the type of brute-force sequence considered above. Here, the first cell which is operated upon is cell 0. This cell is first read to see if it contains a 0. But immediately after this is done, all of the other cells are checked to see if they still contain the 0 bits which are expected. Thereafter, a 1 is written into cell 0, following which all of the other cells are checked to see if they contain 0 bits. Similarly, a 1 is then read from cell 0, following which all of the other cells are checked, and finally a 0 is written into cell 0 with the subsequent checking of all of the other cells. After this sequence is performed in connection with cell 0, the same sequence is performed in connection with cell 1. A 0 is written into it, after which all other cells are checked to see if they still contain 0's, a 1 is then written into cell 1, following which all other cells are checked, etc. A complete illustrative sequence is as follows:

1. W0 — 0—N
2. $R0^0$, $W1^0$, $R1^0$, $W0^0$ — 0—N
3. W1 — 0—N
4. $R1^1$, $W0^1$, $R0^1$, $W1^1$ — 0—N

That this lengthy sequence (the sequence requires a total of $2(N+1)+8(N+1)^2$ operations) actually tests for all of the primary failure modes of interest will be apparent to those skilled in the art. What will now be shown is that the complete addressing of the cells in the proper sequence is almost wholely automatic.

Initially, timing and control circuits 24 reset the two counters and stages X, Y and 0. Each counter cycles through a count of 0—N. Conductor 54 is pulsed first so that cell 0 of the chip is selected since the initial count in counter 16 is 0. At the same time, the command signals on cable 66 cause a 0 to be written in this cell. The first clock pulse on conductor 82 increments the count in counter 16 to a value of 1 so that cell 1 is now selected. Conductor 54 is once again pulsed and the control signals extended to the chip control the writing of a 0 in cell 1. In a similar manner, counter 16 is continuously pulsed until 0's have been written in all cells of the chip. The next clock pulse resets counter 16 and sets stage X in the 1 state.

The first time a 10 combination appears in stages X and Y, the timing and control circuits cause the overall counter to be reset (only stage X being switched at this time from the 1 state to the 0 state). The timing and control circuits then pulse conductor 56 so that address 0 in counter 18 is extended to the chip to be tested. At the same time, the commands extended to the chip control the reading of the bit value stored in cell 0. It should be noted that at this time since both counters contain a count 0, error flag gate 38 cannot operate. To check that a 0 is detected as is anticipated, conductor 78 is extended directly to the timing and control circuits as shown. After cell 0 is read, clock pulses are applied in succession on conductor 82. Following each clock pulse, conductor 54 is pulsed. The count of the inner counter advances and successive addresses are transmitted to the chip. The command signals on cable 66 control a read operation and the signal on conductor 70 indicates that a 0 should be read since a 0 should still be stored in all cells. As long as a 0 is read from each cell, no error signal appears on conductor 74.

After counter 16 has cycled to a count of N, it is reset and stage X switches to the 1 state. This is an indication to the timing and control circuits that a 1 should be written into the "outer" cell — cell 0. At this time, a clock pulse is inhibited from appearing on conductor 82 and instead conductor 56 is pulsed. The command signals extended to the chip control the writing of a 1 in cell 0. Thereafter, the count in counter 16 is advanced and all other cells are checked to see if they contain 0's. It should be noted that the first cell which is checked is cell 0, and a 1 bit appears on conductor 78. Since a 0 should be present in all other cells, conductor 70 represents a 0 bit. However, an error signal is not extended over conductor 74 to the timing and control circuits because when both counters contain a count 0 error flag gate 38 is disabled.

After all of the other cells have been checked to see that the 0's originally contained in them have not been disturbed, counter 16 is reset once again and stages X, Y represent 01. This is an indication to the timing and control circuits to perform the R1[1] sequence. The address in the outer counter is used to read the 1 bit which should appear in cell 0, and then the inner address counter is cycled to check that 0's still appear in all of the other cells. After all of the cells have been checked in this manner, inner address counter 16 is reset once again and stages X, Y represent a binary combination 11. This is an indication to the timing and control circuits that the W0[0] sequence should be performed. The address in the outer counter is first used to control the writing of a 0 in cell 0, after which all of the other cells are checked to see that the 0's originally stored in them have not been disturbed.

After the first R0[0], W1[0], R1[0], W0[0] sequence is completed (for cell 0), stages X, Y are switched to the 00 state and the inner address counter is reset. Stages X and Y both in the 0 state indicate that the sequence should begin again on the next higher cell — cell 1. This next higher cell is accessed automatically because when stages X and Y switch from the 11 state to the 00 state, the count in counter 18 is incremented.

This purpose continues until the outer address counter represents a count of N. After the overall sequence has been performed on cell N (that is, four distinct operations on cell N, each of which is followed by checking of all other cells), all of the stages in counters 16 and 18, and stages X and Y are reset. The resetting of counter 18 extends a carry bit to stage 0 which switches from the 0 state to the 1 state. The signal on conductor 80 informs the timing and control circuits that sequence 2 has been completed in connection with all cells.

Sequence 3 is now executed; it is the same as sequence 1 except for the fact that a 1 is written into every cell rather than a 0. Immediately thereafter, sequence 4 is executed and it is the same as step 2 except that 1 and 0 values are interchanged. After sequence 4 is executed, counter 18 is reset and a carry is extended to stage 0. The signal on conductor 80 goes low to modify the timing and control circuits that the chip has been completely tested and that a new chip can be moved under the probes for testing.

What is basic to the system of FIG. 5 is the use of inner and outer address counters for automatically addressing the cells simply by extending clock pulses to the input of the inner address counter. The use of intermediate stages X and Y allows multiple operations on the cells under control of the inner address counter for each state of the outer address counter. Although the use of two stages X and Y permits four such inner address cycles for each count in the outer address counter, the number of inner address counter cycles for each outer address counter count can be controlled simply by having the timing and control circuits examine the stages between the two counters to detect a predetermined bit combination after which the outer address counter is incremented. It is possible to provide for the setting and resetting of selected stages between the two counters, under control of the timing and control circuits, for allowing the inner address counter to cycle a selected number of times for each count container in the outer address counter.

Not only is the addressing automatic in this manner, this kind of test sequence allows an error to be determined very easily. During steps 1 and 2, the bit value on conductor 70 represents a 0 and during steps 3 and 4 it represents a 1. Whenever the comparator determines a mismatch of bit values on conductors 70, 78 it is an indication that an error has occurred. The only exceptions are some of the operations performed on a cell identified by both counters. (It is apparent that identical addresses in the two counters do not necessarily require the bit values on conductors 70 and 78 to be different; when the two addresses are the same it is only in some cases that an "error" condition may be indicated even though there really is none.) To prelude erroneous registering of an error, all that is required is the use of a comparator to inhibit error flag gate 38 whenever the two addresses are the same. Of course, in such a case, to check that the cell being operated upon during a read operation contains the correct bit it is necessary to extend conductor 78 directly to the timing and control circuits. But the only time that the timing and control circuits themselves must check the value of a bit read from a cell is when conductor 56 is pulsed to control the addressing of the cell by the outer address counter. U.S. Pat Nos. 3,311,890 and 3,444,526 disclose various of the black boxes disclosed in FIG. 5.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

I claim:

1. A system for testing the memory cells on a chip comprising inner address cycling counter means for representing a cell address, intermediate stage counter means, outer address cycling counter means for representing a cell address, clock means normally operative continuously to increment the address in said inner address counter means, means responsive to the completion of a cycle of said inner address counter means for changing the state represented by said intermediate stage counter means, means responsive to the representation of a predetermined state by said intermediate stage counter means for incrementing the address in said outer address counter means, gating means for selectively transmitting to said chip the address contained in one of said inner and outer address counter means, and means for controlling said gating means to transmit the address in said outer address counter means at most once for each complete cycling of said inner address counter means and the transmission of all addresses represented therein.

2. A system in accordance with claim 1 further including means for transmitting control information to said chip for each address transmitted thereto to indicate the type of operation to be performed on the addressed cell.

3. A system in accordance with claim 2 further including means for representing a bit value to be read from an addressed cell during all read operations performed while said inner address counter means is incremented through a complete cycle, means for comparing said bit value to the bit value read from an addressed cell and in response to a mismatch therebetween for indicating the occurence of an error, and means for inhibiting the operation of said indicating means when the same address is represented in both of said inner and outer address counter means.

4. A system in accordance with claim 1 further including means for representing a bit value to be read from an addressed cell during all read operations performed while said inner address counter means is incremented through a complete cycle, means for comparing said bit value to the bit value read from an addressed cell and in response to a mismatch therebetween for indicating the occurence of an error, and means for inhibiting the operation of said indicating means when the same address is represented in both of said inner and outer address counter means.

5. A system for testing the logic circuits on a chip comprising inner address cycling counter means for representing a circuit address, outer address cycling counter means for representing a circuit address, means operative to increment the address in said inner address counter means, means responsive to the completion of a predetermined number of cycles of said inner address counter means for incrementing the address in said outer address counter means, gating means for selectively transmitting to said chip the address contained in one of said inner and outer address counter means, and means for controlling said gating means to transmit the address in said outer address counter means at most once for each complete cycling of said inner address counter means and the transmission of all addresses represented therein.

6. A system in accordance with claim 5 wherein said logic circuits are memory cells and further including means for representing a bit value to be read from an addressed cell during all read operations performed while said inner address counter means is incremented through a complete cycle, means for comparing said bit value to the bit value read from an addressed cell and in response to a mismatch therebetween for indicating the occurence of an error, and means for inhibiting the operation of said indicating means when the same address is represented in both of said inner and outer address counter means.

* * * * *